Feb. 14, 1950 J. J. WHARAM ET AL 2,497,283
CONTROL PEDAL FOR MOTOR VEHICLES
Filed March 16, 1945
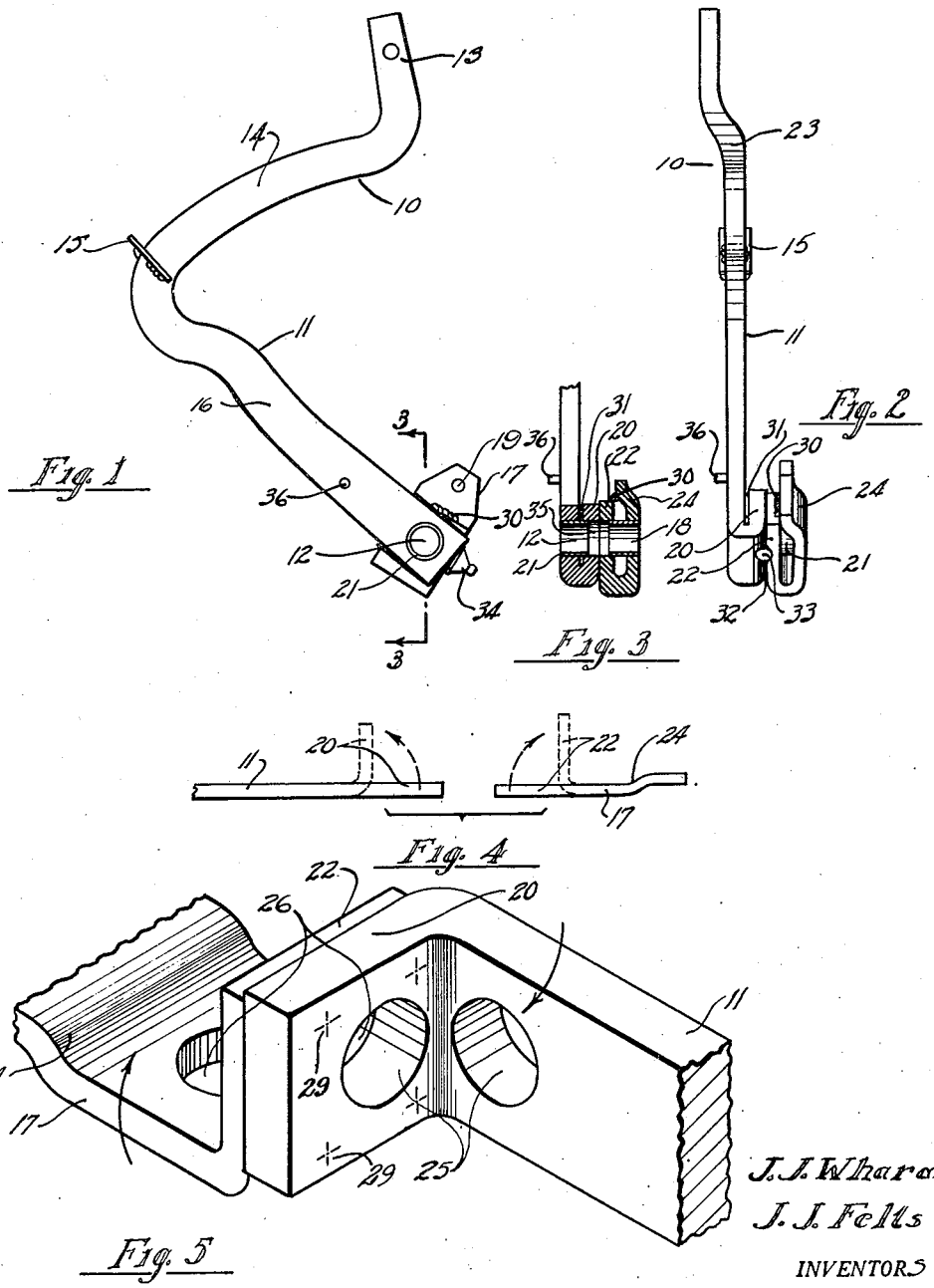
J. J. Wharam
J. J. Felts
INVENTORS Patented Feb. 14, 1950

2,497,283

UNITED STATES PATENT OFFICE 2,497,283

CONTROL PEDAL FOR MOTOR VEHICLES

John J. Wharam, Dearborn, and Jerome J. Felts, Pontiac, Mich., assignors to Ford Motor Company, Dearborn, Mich., a corporation of Delaware Application March 16, 1945, Serial No. 583,102

3 Claims. (Cl. 74—519)

This invention relates to the structure and manufacture of pedals of the type commonly used to control the clutch and brake mechanism of motor vehicles.

The purpose of this invention is to devise a simplified integral pedal to be used in operating the clutch or brake of a motor vehicle which may be fabricated entirely from stampings. The common practice in the industry is to have the clutch or brake pedal generally L-shaped in elevation with means to attach a transversely disposed foot pad at the upper end and means at its lower end to mount it rotatively on a cross shaft. In addition, there is usually a secondary shorter arm adjacent the mounting means to which the actuating linkage leading to the clutch or the brake master cylinder, as the case may be, is attached. The specific form of the pedals may vary widely, due to the arrangement of the various components and the room available for installation; but, in general, all of them follow the above design in essentials.

It has also been almost universal practice to form these pedals by forging because of the strength requirements and the difficulty of satisfactorily fabricating them otherwise. However, as it is not unusual to have such a pedal a foot or more in maximum dimension, and double that in extended length, the cost of forging such articles is considerable. As an alternative, it has been suggested that such pedals might be formed by using a section of tubing as an independent hub; and welding to this hub, in predetermined alignment and at the requisite spacing, two stampings serving as the long and the short arm, respectively. However, a considerable amount of relatively difficult welding is required to attach the arms to the hub and the stresses are transmitted, primarily, through the hub; and the advantage obtained from this method of construction is not sufficient, either from the standpoint of dependability or economy, to warrant its general adoption over the forged construction.

The advantage of the construction shown in this application is that the amount of welding is held to a minimum and the parts are so disposed as not to be dependent primarily upon the weld or the hub proper for maintaining the strength of the component. In addition, a separate hub is not needed and the two individual arms, which make up the completed pedal, furnish the major material necessary for its construction. Further, the number of machining operations are held to a minimum and blanks used are so formed and arranged that it is possible to pilot them during the assembly and forming steps to obtain the exact configuration desired. Those familiar with comparative costs of such devices will readily recognize the economy, both in material and manufacturing operations of the device shown as opposed to that formed in the usual manner by forging or in the less common combination of a hub with individually welded arms attached thereto. At the same time, the pedal construction is not deficient in strength and achieves the necessary rigidity from proper combination of elements rather than by relying upon mere mass of metal alone.

With these and other considerations in view, the invention consists of the apparatus described and the method outlined in this specification, claimed in the claims and illustrated in the accompanying drawings, in which:

Figure 1 is a side elevation of a pedal made according to this invention.

Figure 2 is an end view of the pedal taken from the rear as the pedal is customarily mounted on a motor vehicle.

Figure 3 is a partial section taken as indicated by the lines 3—3 of Figure 1.

Figure 4 is a diagrammatic elevation showing the initial step in fabricating the components of the pedal.

Figure 5 is an isometric view of the initial assembly of the components following their processing according to Figure 4.

Referring first to Figure 1 10 indicates generally a clutch or brake control pedal which has a major substantially L-shaped arm 11 having an aperture 12 at its lower end and means 13 to attach the usual foot pad to its upper end. The shorter arm 14 of the L-shaped arm 11 is substantially radially arranged with respect to the aperture 12 and at the lower extremity of this arm is mounted the floor stop 15. The radially arranged section is adapted to extend through the vehicle floor and the lower portion 16 is, of course, located beneath the vehicle floor board. This general configuration is customary whether the article is forged or constructed by other means.

Associated with the major arm 11 is the minor or linkage arm 17, which also has an aperture 18 and attaching means 19 adjacent its outer end for engagement with the clutch or brake linkage, as the case may be. The two arms 11 and 17 are arranged with the apertures 12 and 18 in alignment and are welded together so that movement of the major arm is directly transmitted to the minor arm and through it to the mechanism to be operated.

Reference is now made to Figures 2 and 3 which indicate the manner in which the pedal itself is fabricated. It will be noted that the major arm 11 has the lower portion 20 bent through 180 degrees back upon itself and that the minor arm 17 also has its lower portion 22 similarly disposed and that the two portions 20 and 22 are then secured to the arms 11 and 17, respectively. It will be apparent from Figure 3 that this provides the necessary bearing for the shaft bushings 21 which are inserted in the apertures 12 and 18 and, also, the requisite transverse spacing between the two arms to obtain the necessary clearance for the operation of the linkages. Initially, a linear substantially rectangular blank corresponding to the major arm 11 is stamped out and then is bent to the outline shown in Figure 1 and the offset 23 shown in Figure 2 formed. Similarly, a linear blank for the linkage arm 17 is blanked out and the joggle 24 (Figs. 2 and 3) is applied to it. The spaced holes 25, 25 and 26, 26 which later co-operate to form the apertures 12 and 18 are also pierced. Reference is now made to Figure 4 in which it is shown that the extreme lower ends of the two blanks are bent through approximately 90 degrees as the initial step in the assembly. The two arms are then brought together as shown in Figure 5 being piloted on the lowermost holes 25 and 26 of the two arms, respectively, and then arranged as to the desired angular relationship conforming to that shown in Figure 1. While so supported the two ends are spot-welded together as indicated at 29. The resultant components can further be piloted and supported on the permanently aligned holes 25 and 26, while the remaining bend through an additional 90 degrees is taken in each arm 11 and 17, as shown in Figure 5. The initial location of the holes 25 and 26 can be controlled and so fixed during the subsequent bending operation that substantial alignment can be obtained even though the operations are carried out on a production basis. When these 180-degree bends have been completed, the bent back portions are secured to the respective major reaches of the arm by arc welding, the lower portion 22 being secured to the arm 17 by the welding bead 30 and the corresponding parts of the major arm 11 by the bead 31. In addition, bead 32 is formed in the junction between the two components in the adjacent lower end of the major arm 11, a hole 33 subsequently being drilled through the bead and the adjoining portions of the two arms to the central cavity formed by the aligned apertures 12 and 18 and tapped to accommodate the lubrication fitting 34. Thereafter, the apertures are line reamed and the shaft bushings 21 are pressed in place and burnished. The bushings are long enough to reach completely through the outer thickness of each arm and partially through the inner portions 20 and 22, leaving the central bore 35 free to permit the free circulation of lubricant. The floor stop 15 is then welded into place as shown and a pin 36 may be inserted for the attachment of the usual return spring. It is also possible to omit one of the bending steps by securing the blanks together after the forming step and then bending them through 180° to bring the apertures in common alignment.

The advantage of this method of manufacture, from a structural viewpoint should be apparent. The principal torsional stresses in each of the arms are not localized at the hub, but are directly transmitted to each other through the spot-welded joint between them. The welding beads which secure the folded portions of each arm together are not the primary connection and hence need not be particularly extensive. The advantage over the welded hub and arms' construction is considerable both in increased strength and in the economy of material, while the loads are transmitted directly rather than through a third element. The structure made, as shown, is much cheaper than one developed from a forging. It will be noted that substantial separation between the arms is possible, permitting adaptation of the article to different clearance conditions and serves to reduce the unit stress on the bushing by extending its length. The shaft bushings do not, of course, carry any of the torsional load.

Certain changes may be made in the construction disclosed without departing from the spirit of the invention and it is the intention to cover by the claims such variations as are reasonably included therein.

The invention claimed is:

1. In a pedal construction a main arm having its lower end folded upon itself, a linkage arm adapted to engage an actuating mechanism through one end having the other end folded upon itself, said folded portion of said main arm being in face-to-face relationship and directly abutting upon each other, said folded portions of the linkage arm being also in face-to-face relationship but substantially spaced from each other except at the end of the folded portion where they are welded together, a welded connection between said main arm and the folded portion thereof at the free end of said folded portion, a welded connection between said linkage arm and the folded portion thereof at the free end of said folded portion, and a bore extending transversely through the lower ends and folded portions of said arms.

2. The structure of claim 1 in which the initial juncture between the main and linkage arms is made by spot welding.

3. The structure of claim 1 in which the linkage arm is constructed of lighter stock than the major arm.

JOHN J. WHARAM.
JEROME J. FELTS.

REFERENCES CITED

The following references are of record in the file of this patent:

UNITED STATES PATENTS

| Number | Name | Date |
|---|---|---|
| 1,306,119 | Pharo | June 10, 1919 |
| 1,796,114 | Meadowcroft | Mar. 10, 1931 |
| 2,077,279 | Snell | Apr. 13, 1937 |
| 2,176,083 | Leake | Oct. 17, 1939 |
| 2,212,355 | Sherman | Aug. 20, 1940 |